(12) United States Patent
Kawada et al.

(10) Patent No.: US 10,505,430 B2
(45) Date of Patent: Dec. 10, 2019

(54) ROTOR OF BRUSHED MOTOR AND BRUSHED MOTOR

(71) Applicant: Hitachi Automotive Systems Engineering, Ltd., Hitachinaka-shi, Ibaraki (JP)

(72) Inventors: Sachio Kawada, Hitachinaka (JP); Kouichi Kuniyasu, Hitachinaka (JP); Kazuhiro Saito, Hitachinaka (JP)

(73) Assignee: Hitachi Automotive Systems Engineering, Ltd., Hitachinaka-shi (JP)

( * ) Notice: Subject to any disclaimer, the term of this patent is extended or adjusted under 35 U.S.C. 154(b) by 113 days.

(21) Appl. No.: 15/764,664

(22) PCT Filed: Jul. 29, 2016

(86) PCT No.: PCT/JP2016/072250
§ 371 (c)(1),
(2) Date: Mar. 29, 2018

(87) PCT Pub. No.: WO2017/056670
PCT Pub. Date: Apr. 6, 2017

(65) Prior Publication Data
US 2018/0278131 A1 Sep. 27, 2018

(30) Foreign Application Priority Data
Sep. 30, 2015 (JP) .................. 2015-192503

(51) Int. Cl.
*H01R 39/04* (2006.01)
*H02K 13/00* (2006.01)
*H02K 7/00* (2006.01)

(52) U.S. Cl.
CPC ........... *H02K 13/006* (2013.01); *H02K 7/003* (2013.01); *H01R 39/04* (2013.01)

(58) Field of Classification Search
CPC ................................. Y10T 29/49011; H01R 39/04; H02K 13/006; H02K 7/003
(Continued)

(56) References Cited

U.S. PATENT DOCUMENTS 2,541,047 A * 2/1951 Frisbie ................... H01R 39/04
310/235
3,080,615 A * 3/1963 Carlson .................. H01R 43/08
156/303.1
(Continued)

FOREIGN PATENT DOCUMENTS

EP 1 708 316 A1 10/2006
JP 6-153458 A 5/1994
(Continued)

OTHER PUBLICATIONS

International Search Report (PCT/ISA/210) issued in PCT Application No. PCT/JP2016/072250 dated Nov. 22, 2016 with English translation (five pages).
(Continued)

*Primary Examiner* — Thanh Lam
(74) *Attorney, Agent, or Firm* — Crowell & Moring LLP

(57) ABSTRACT

Provided is a rotor of a brushed motor capable of reducing the occurrence of contamination during press-fitting of a commutator onto a knurling and reducing defect factors due to rotor contamination to improve productivity. In a rotor of a brushed motor having a commutator press-fitted onto a knurling of a shaft, an inclined surface is provided on an inner circumferential side of the commutator, and an angle of the inclined surface is configured to be smaller than an angle of an axial end portion of the knurling. The knurling may be configured to be at a position different from a shaft stepped end surface of the shaft and the knurling may be
(Continued)

configured to be positioned axially inward of the commutator from an end surface of the commutator.

3 Claims, 5 Drawing Sheets

(58) Field of Classification Search
USPC .......................... 310/233, 216.121–216.123
See application file for complete search history.

(56) References Cited

U.S. PATENT DOCUMENTS

| | | | | |
|---|---|---|---|---|
| 3,212,170 | A | * 10/1965 | Marshall | ................... H02K 3/00 |
| | | | | 29/598 |
| 4,833,769 | A | * 5/1989 | Tomite | ................... H02K 13/08 |
| | | | | 264/272.2 |
| 5,639,044 | A | 6/1997 | Cardini et al. | |
| 2005/0168100 | A1* | 8/2005 | Abe | ................... F02N 11/00 |
| | | | | 310/233 |
| 2017/0149313 | A1* | 5/2017 | Schulze | ................... H02K 3/12 |

FOREIGN PATENT DOCUMENTS

| | | |
|---|---|---|
| JP | 2002-272063 A | 9/2002 |
| JP | 2003-9471 A | 1/2003 |

OTHER PUBLICATIONS

Japanese-language Written Opinion (PCT/ISA/237) issued in PCT Application No. PCT/JP2016/072250 dated Nov. 22, 2016 (four pages).

\* cited by examiner

ROTOR OF BRUSHED MOTOR AND BRUSHED MOTOR

TECHNICAL FIELD

The present invention relates to a rotor of a brushed motor, in particular to a fixed portion between a shaft and a commutator.

BACKGROUND ART

Recently it is well known that, in the automobile industry, electronic control is progressing in various parts of automobiles such as throttle, brake, and intake and exhaust valves of engine. Together with this movement, rotating electric machines are being used in various parts of automobiles and the production quantity tends to increase. Therefore, reduction in cost and improvement in production efficiency are strongly required for motors and rotors.

Conventionally, fastening of a commutator and a shaft of a rotor is in many cases carried out using a method of providing a knurling on the shaft and press-fitting the commutator onto the knurling. A disadvantage in the method of press-fitting the commutator using the knurling is that contamination is likely to occur at the time of press-fitting. The commutator shaved by the knurling becomes contamination and adheres to the rotor. As a result, scratches and indentations are made on the shaft of the rotor and there is a potential to deteriorate the yield.

There is no conventional technology that has been proposed as a means for solving this disadvantage. However, as a technology for providing a motor and a commutator that can reduce an initial rupture during commutator fixing work at the time of manufacturing and a subsequent creep rupture over time, has excellent molding workability for the commutator, can improve the coaxial accuracy between the commutator and the shaft, and can improve the productivity, a commutator has a structure in which a plurality of conductors integrally molded with resin are arranged in a cylindrical shape on an outer circumference, an inner circumferential surface of the resin of the commutator has a tapered shape, a diameter $\varphi$ is minimum at an intermediate portion, the diameter becomes larger as it goes closer to an end portion. A motor characterized in that a commutator is made of resin and its inner circumferential surface has a tapered shape whose inner diameter is minimum at an intermediate portion and becomes larger toward both ends, and a shaft is press-fitted and fixed to the inner circumferential surface of the commutator has been proposed.

CITATION LIST

Patent Literature

PTL 1: JP 6-153458 A

SUMMARY OF INVENTION

Technical Problem

In the conventional technology, the inner diameter of the commutator is tapered so as to be able to reduce the initial rupture at the time of press-fitting and the creep rupture and to improve productivity. However, measures to reduce contamination occurring at the time of press-fitting have not been considered.

A problem to be solved by the present invention is with regard to reducing the occurrence of contamination during press-fitting of a commutator onto a knurling so as to reduce defect factors due to rotor contamination and to improve productivity.

Solution to Problem

In order to solve the above-mentioned problems, for example, the configuration described in the claims is adopted.

The present application includes a plurality of means for solving the above-mentioned problems. An example thereof is a rotor of a brushed motor having a commutator press-fitted onto a knurling of a shaft, in which an inclined surface is provided on an inner circumferential side of the commutator, and an angle of the inclined surface is smaller than an angle of an axial end portion of the knurling.

Advantageous Effects of Invention

The present invention can provide a rotor of a brushed motor capable of reducing the occurrence of contamination during press-fitting of a commutator onto a knurling and reducing defect factors due to rotor contamination to improve productivity.

Problems, configurations, and effects other than those mentioned above will be clarified by the description of the following embodiments.

DESCRIPTION OF EMBODIMENTS

Embodiments of the present invention will be described below with reference to the drawings.

First Embodiment

The present invention realizes a rotor in which the occurrence of contamination at the time of press-fitting of a commutator is reduced and manufacturing defect factors due to contamination is reduced.

Figure 1:
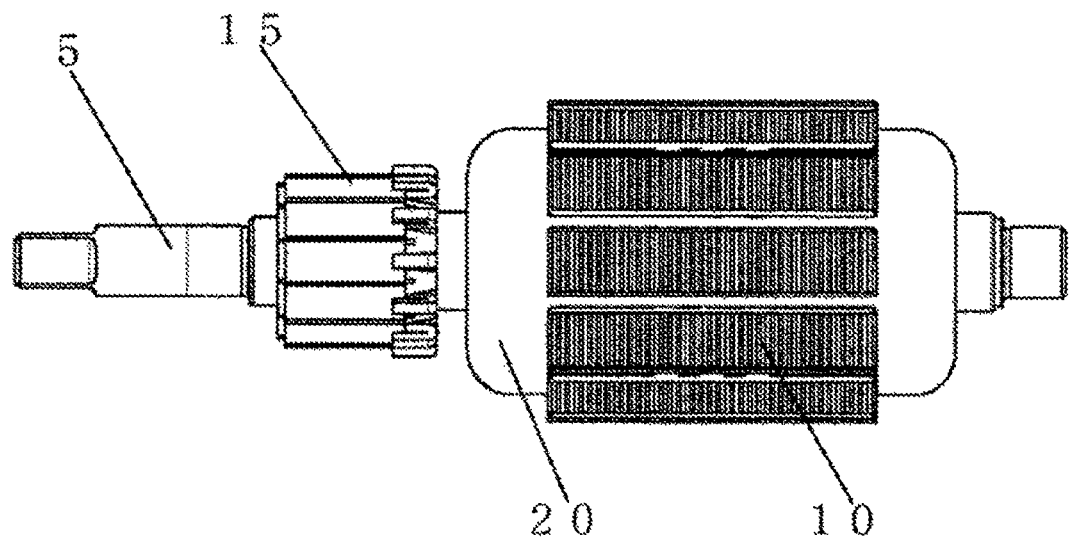
FIG. 1 is an example of a rotor.

FIG. 1 illustrates an example of a rotor according to this embodiment. The rotor of this embodiment is constituted by a shaft 5 made of an iron material, a core 10 made of an iron material and press-fitted and fixed to the shaft, a commutator 15 in which a plurality of commutator pieces are arranged in a cylindrical shape and integrally molded with resin, and a coil 20 wound around the core and having an end portion connected to the commutator.

This rotor is used by attaching one or more bearings to the shaft so as to be assembled to a motor.

Figure 2:
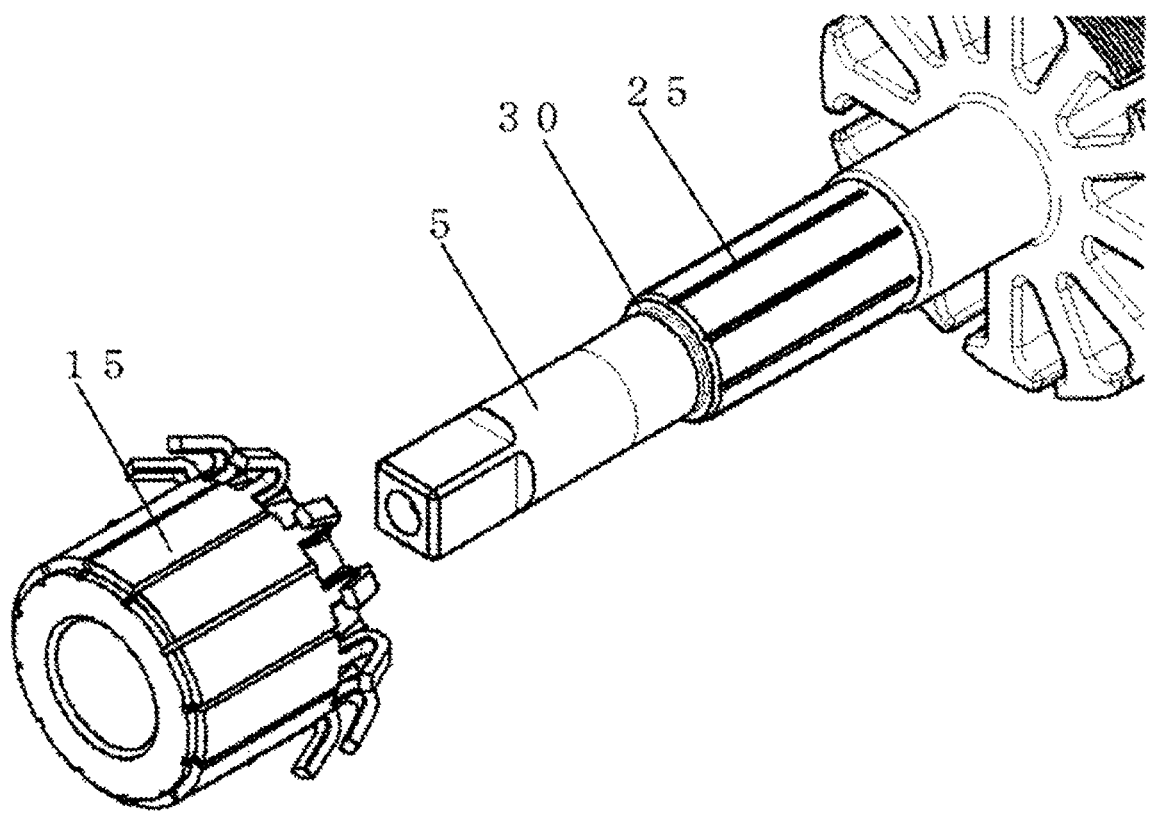
FIG. 2 is an exploded perspective view of a first embodiment.

FIG. 2 illustrates an exploded perspective view of this embodiment. Two or more knurlings 25 are provided on the shaft 5 in a circumferential direction. In addition, the axial position of the knurling starts from a shaft stepped end surface 30.

Figure 3:
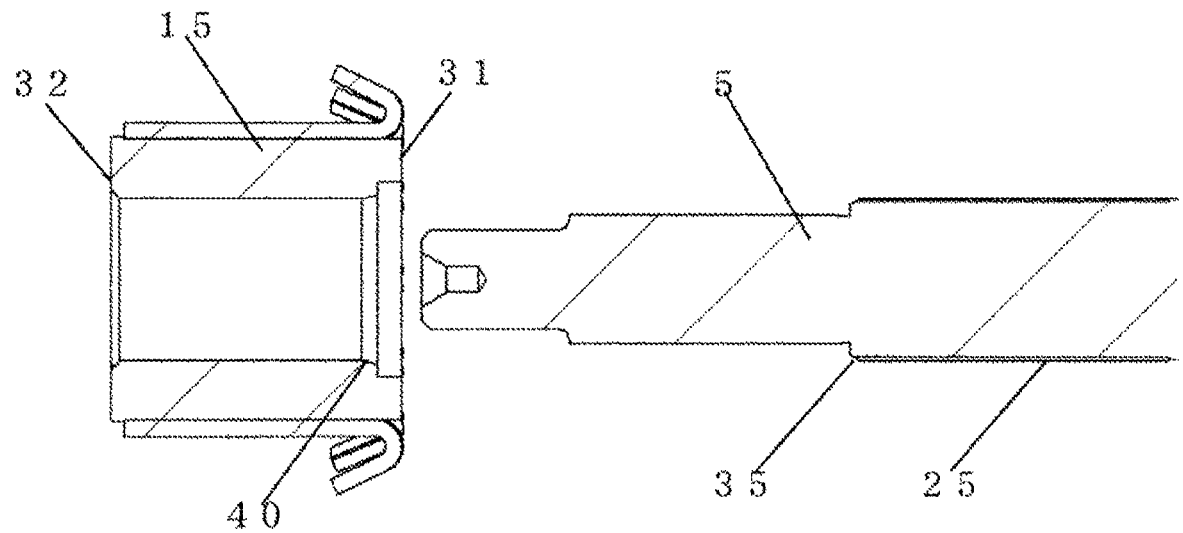
FIG. 3 is an exploded cross-sectional view of the first embodiment.

FIG. 3 illustrates an exploded cross-sectional view of this embodiment. An inclined surface 40 is formed on an inner circumferential side of the commutator 15. At this time, the inclined surface 40 on an inner circumference of the commutator can be located on a rear surface side 31 of the commutator 15 but may be located on a front surface side 32 of the commutator 15. Here, the rear surface side of the commutator 15 is a side where the commutator 15 faces the shaft 5 during press-fitting, which is a side where the core 10 is present. In addition, the angle of the inclined surface 40 on the inner circumference of the commutator may be the same or different between front and rear portions. Meanwhile, an inclined surface or a vertical surface is formed in an axial end portion 35 of the knurling 25. At this time, the angle of the axial end portion 35 of the knurling 25 (an angle formed between the inclined surface or the vertical surface at an end portion of the knurling 25 and a surface parallel to an axial direction of the knurling 25) is only required to be greater than zero and equal to or less than 90°.

Figure 4:
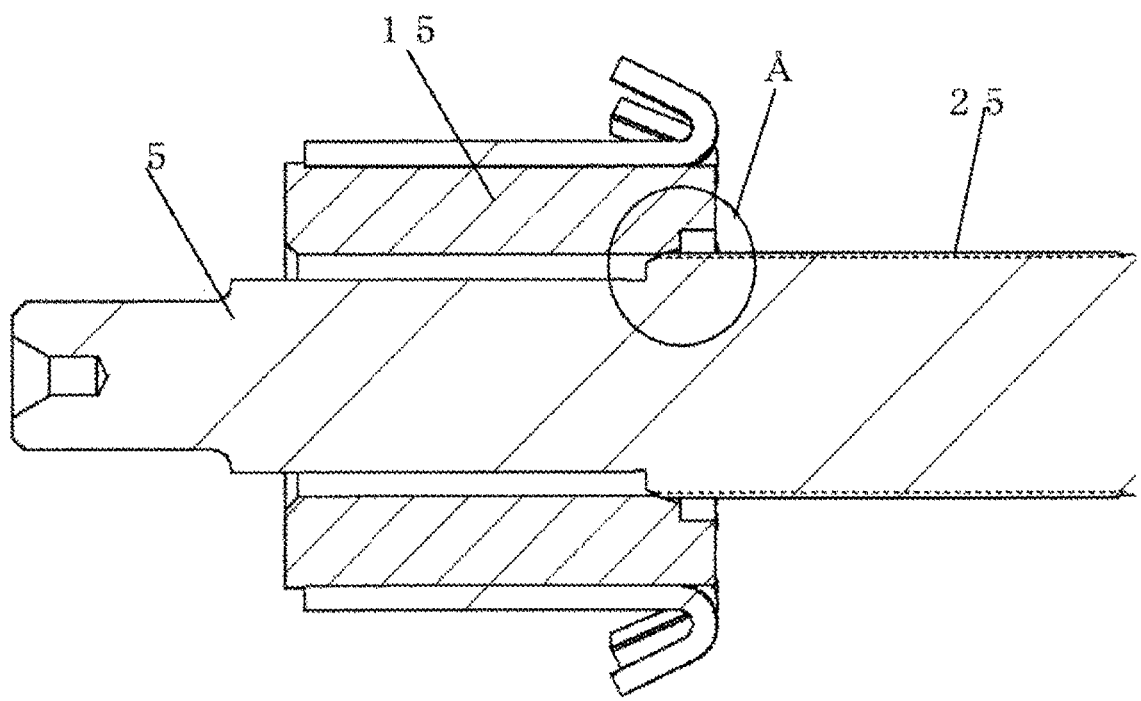
FIG. 4 is a cross-sectional view immediately before press-fitting of a commutator in the first embodiment.
Figure 5:
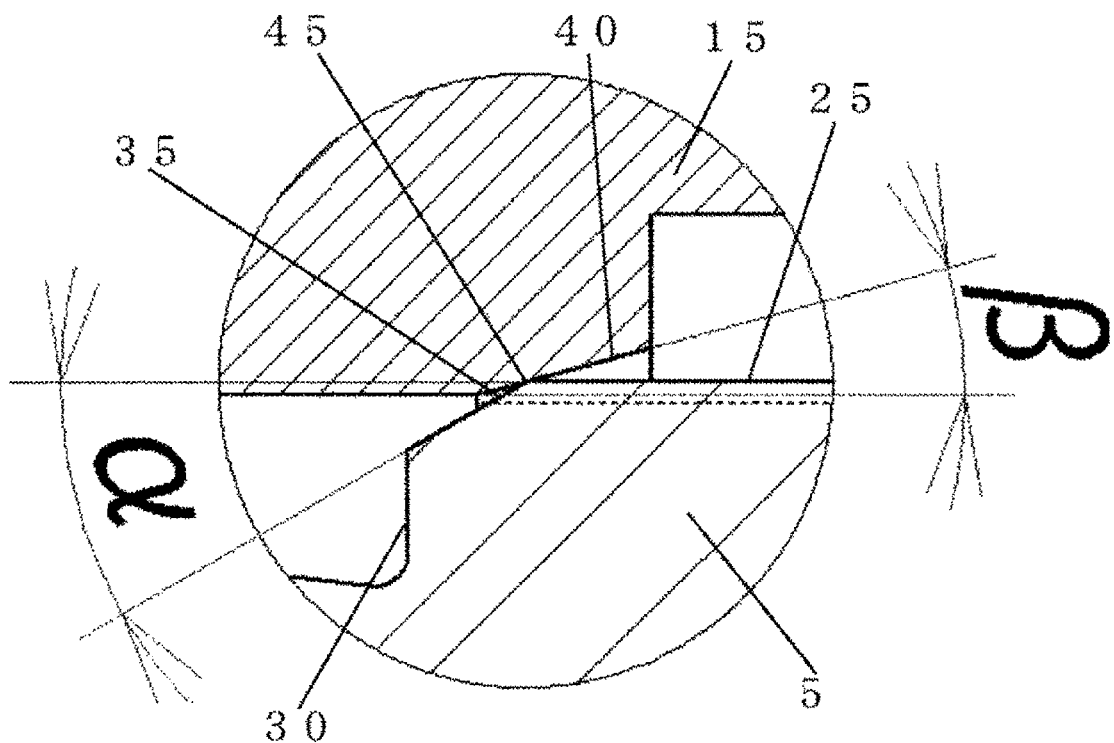
FIG. 5 is an enlarged view of a portion A in FIG. 4.

FIG. 4 illustrates a cross-sectional view immediately before the press-fitting of the commutator in this embodiment and FIG. 5 illustrates an enlarged view of a portion A in FIG. 4. When the angle of the axial end portion 35 of the knurling 25 is assumed as α and the angle of the inclined surface 40 on the inner circumferential side of the commutator 15 is assumed as β, the relationship between the angles α and β, is set to be α>β. As a result, the press-fitting of the commutator 15 is always started from an extreme distal end portion 45 of the knurling 25 and the press-fitting is started as if the knurling 25 cuts into the commutator. Accordingly, contamination at the time of press-fitting decreases.

Figure 6:
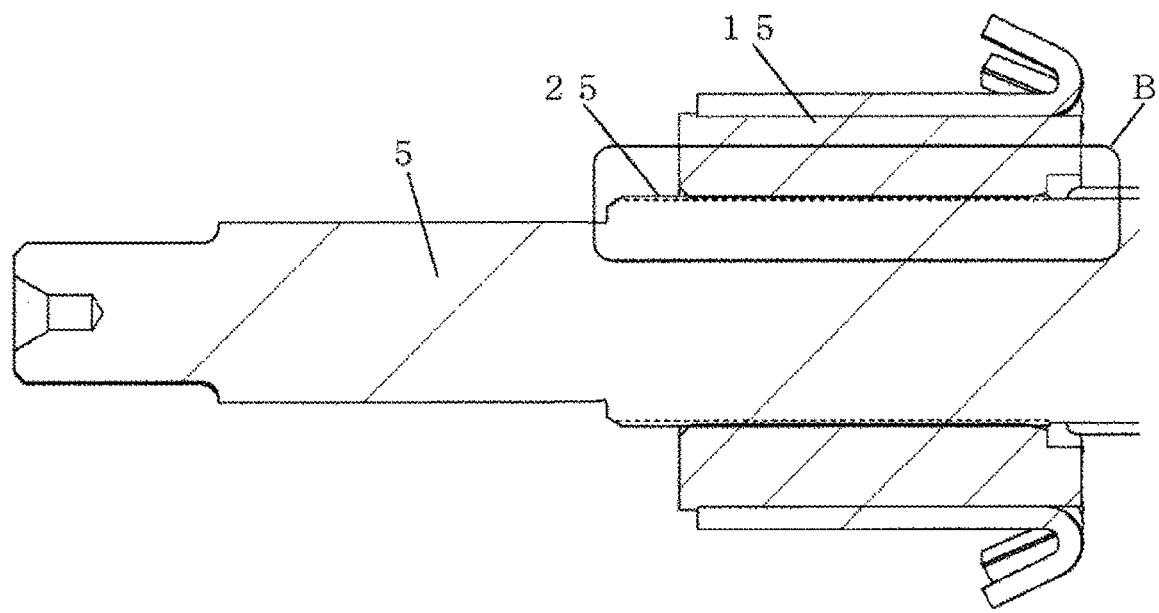
FIG. 6 is a cross-sectional view after completion of press-fitting of the commutator in the first embodiment.
Figure 7:
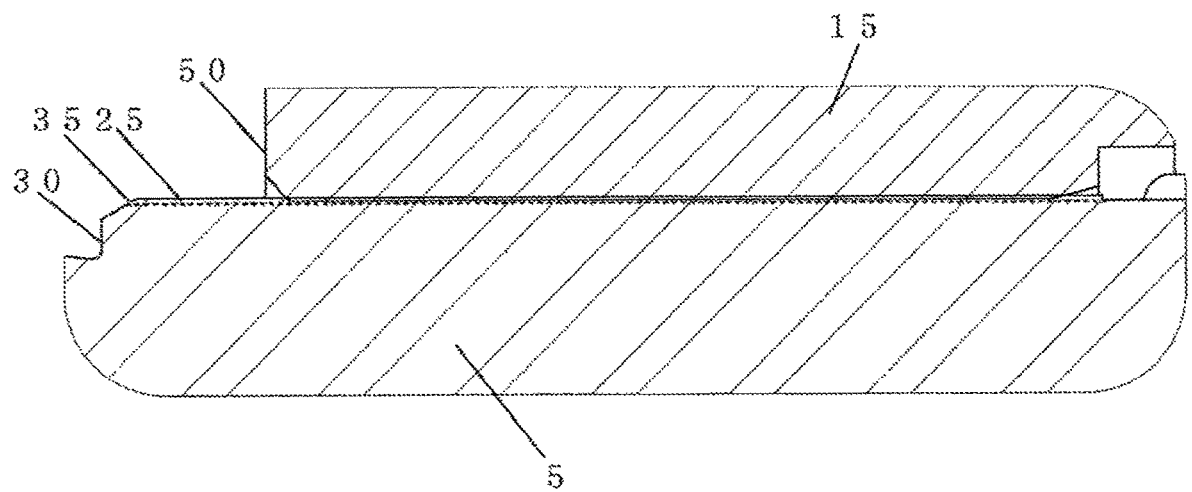
FIG. 7 is an enlarged view of a portion B in FIG. 6.

FIG. 6 illustrates a cross-sectional view after the completion of the press-fitting in this embodiment and FIG. 7 illustrates an enlarged view of a portion B in FIG. 6. The press-fitting is completed with the axial end portion 35 of the knurling 25 protruding from an end surface 50 of the commutator 15.

Second Embodiment

Figure 8:
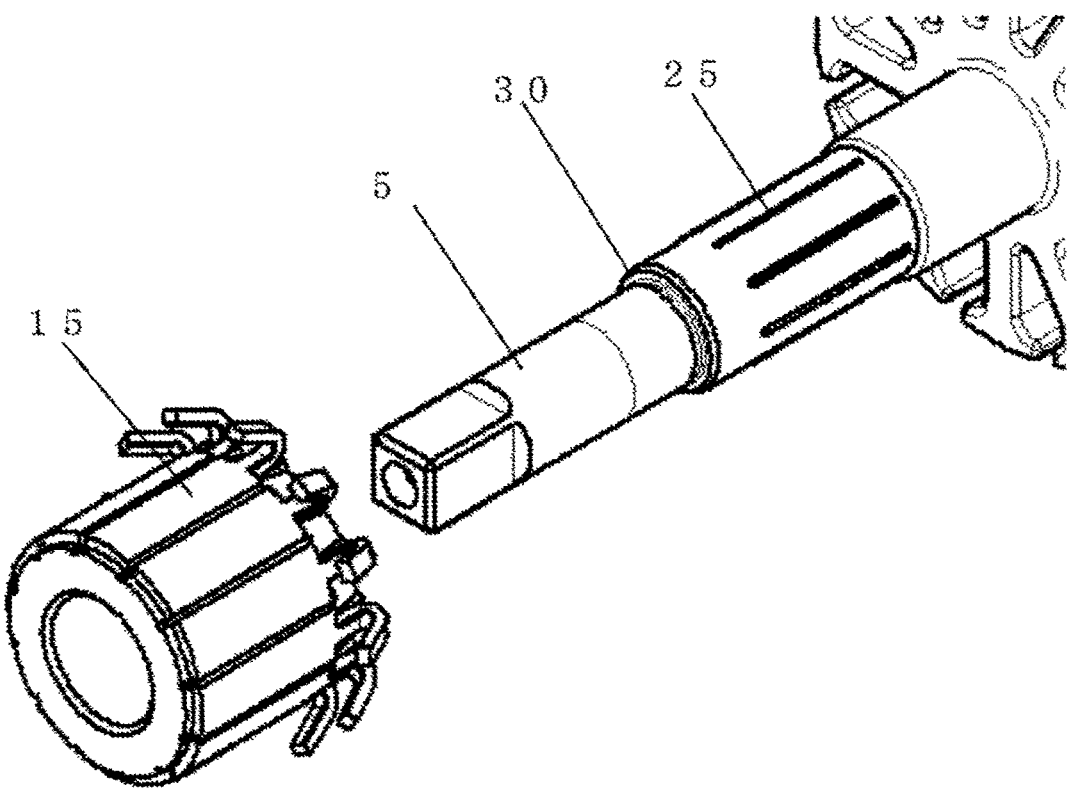
FIG. 8 is an exploded perspective view of a second embodiment.

FIG. 8 illustrates an exploded perspective view of this embodiment. A knurling 25 starts from a position away from a shaft stepped end surface 30. Setting of an angle between an axial end portion 35 of the knurling 25 and an inclined surface 40 on the inner circumferential side of a commutator 15 is as described in the first embodiment.

Figure 9:
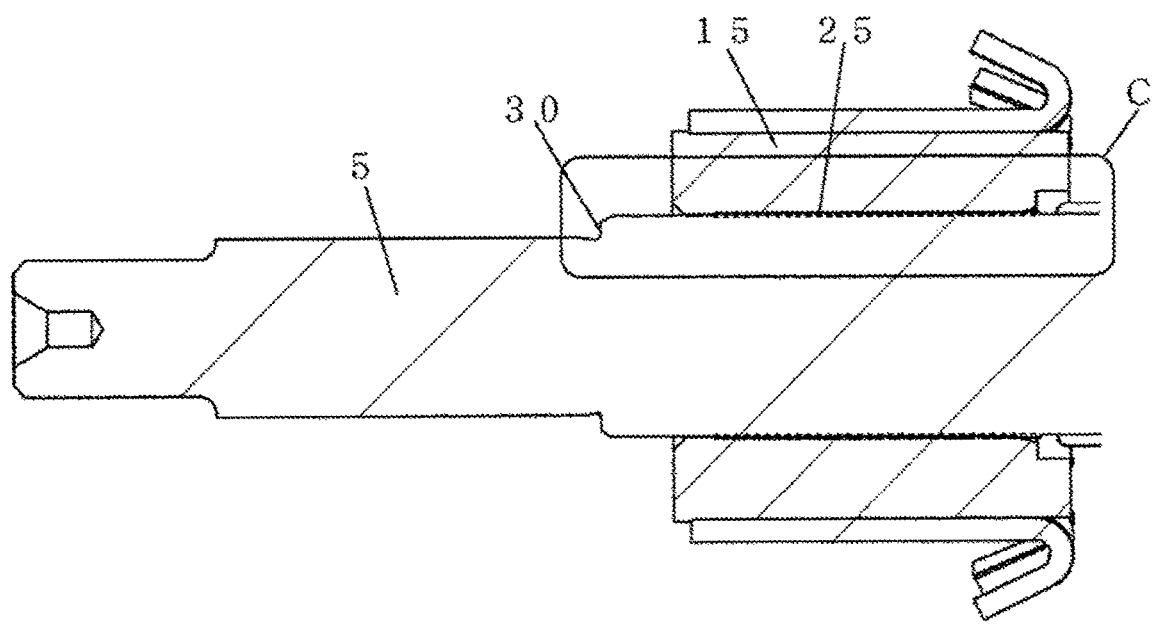
FIG. 9 is a cross-sectional view after completion of press-fitting of a commutator in the second embodiment.
Figure 10:
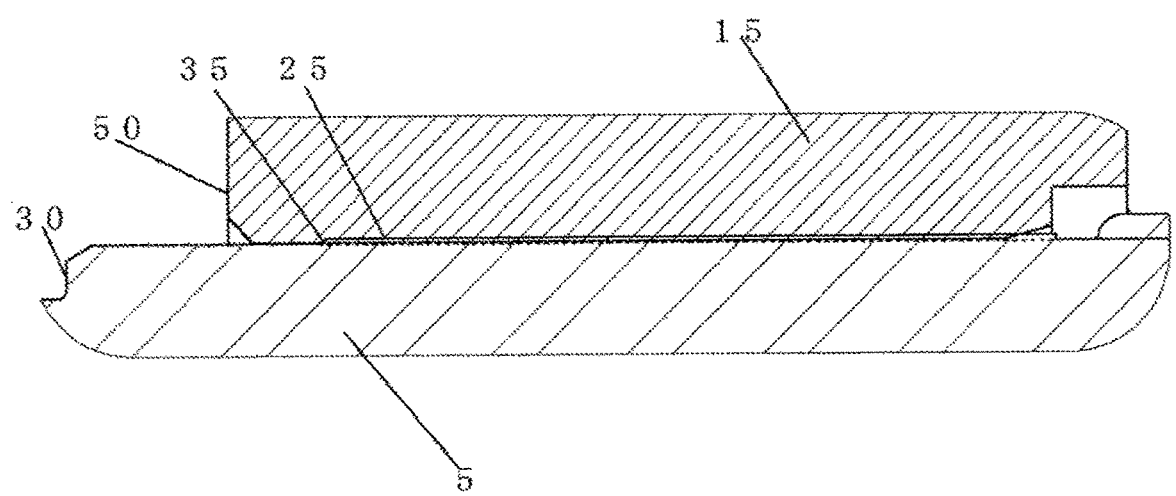
FIG. 10 is an enlarged view of a portion C in FIG. 9.

FIG. 9 illustrates a cross-sectional view after the completion of the press-fitting in this embodiment and FIG. 10 illustrates an enlarged view of a portion C in FIG. 9. The press-fitting is completed at a position where the axial end portion 35 of the knurling 25 does not protrude from an end surface 50 of the commutator 15.

Since the knurling does not pass through the commutator, contamination at the time of press-fitting will stay between the commutator and the knurling. As a result, the occurrence of contamination can be suppressed and contamination also can be prevented from jumping out from a press-fitting portion to the outside.

The invention is not construed to be limited to the aforementioned embodiments and includes various types of variations. For example, the aforementioned embodiments have been described in detail in order to make the description of the invention easy to understand. Therefore, the embodiments are not necessarily limited to the ones provided with the whole configurations that have been described. In addition, part of the configuration of a certain embodiment can be replaced with the configuration of another embodiment, while it is also possible to add the configuration of a certain embodiment to the configuration of another embodiment. Part of the configuration of each of the embodiments can be subjected to addition, deletion, and replacement of another configuration.

REFERENCE SIGNS LIST 5 shaft
10 core
15 commutator
20 coil
25 knurling
30 shaft stepped end surface
31 rear surface side of commutator 15
32 front surface side of commutator 15
35 axial end portion of knurling 25
40 inclined surface
45 extreme distal end portion of knurling 25
50 end surface of commutator 15

The invention claimed is:

1. A rotor of a brushed motor, comprising a commutator press-fitted onto a knurling of a shaft,
    wherein an inclined surface is provided on an inner circumferential side of the commutator, and
    an angle of the inclined surface is smaller than an angle of an axial end portion of the knurling.

2. The rotor of the brushed motor according to claim 1, wherein the knurling is at a position different from a shaft stepped end surface of the shaft and the knurling is positioned axially inward of the commutator from an end surface of the commutator.

3. A brushed motor comprising the rotor of the brushed motor according to claim 1.

* * * * *